(12) United States Patent
Baratta et al.

(10) Patent No.: US 9,715,371 B2
(45) Date of Patent: Jul. 25, 2017

(54) WEB-BASED POINT OF SALE BUILDER

(71) Applicants: Wayne Baratta, Poughkeepsie, NY (US); Quentin Olson, Port Townsend, WA (US)

(72) Inventors: Wayne Baratta, Poughkeepsie, NY (US); Quentin Olson, Port Townsend, WA (US)

( * ) Notice: Subject to any disclaimer, the term of this patent is extended or adjusted under 35 U.S.C. 154(b) by 0 days.

(21) Appl. No.: 15/198,117

(22) Filed: Jun. 30, 2016

(65) Prior Publication Data

US 2016/0306610 A1     Oct. 20, 2016

Related U.S. Application Data

(63) Continuation of application No. 12/012,666, filed on Feb. 5, 2008, now Pat. No. 9,400,640.

(51) Int. Cl.
| | |
|---|---|
| *G06Q 20/00* | (2012.01) |
| *G06F 9/44* | (2006.01) |
| *G06Q 30/06* | (2012.01) |
| *G06Q 20/20* | (2012.01) |
| *H04L 29/08* | (2006.01) |

(52) U.S. Cl.
CPC ............ *G06F 8/30* (2013.01); *G06F 8/34* (2013.01); *G06Q 20/20* (2013.01); *G06Q 30/06* (2013.01); *H04L 67/02* (2013.01)

(58) Field of Classification Search
CPC ......... G06Q 20/20; G06Q 30/00; B67D 7/068
USPC .......................................................... 705/21
See application file for complete search history.

(56) References Cited

U.S. PATENT DOCUMENTS

| | | | |
|---|---|---|---|
| 5,818,428 A | 10/1998 | Eisenbrandt et al. | |
| 5,987,426 A | 11/1999 | Goodwin, III | |
| 6,629,080 B1 | 9/2003 | Kolls | |
| 7,051,091 B1 | 5/2006 | Cohen et al. | |
| 2003/0041330 A1* | 2/2003 | Smith .................. | B67D 7/068 725/105 |
| 2004/0181454 A1* | 9/2004 | Manno ................. | G06Q 20/20 705/21 |
| 2005/0021409 A1* | 1/2005 | Michaud .............. | G06Q 20/20 705/16 |

OTHER PUBLICATIONS

Co-pending U.S. Appl. No. 11/710,722, filed Feb. 26, 2007, "Point of Sale System with Web-Based Back-Office," by Quentin Olson, 25 pgs.

(Continued)

*Primary Examiner* — Rokib Masud
(74) *Attorney, Agent, or Firm* — Saile Ackerman LLC; Stephen B. Ackerman

(57) ABSTRACT

This invention provides a system and a method for online, web-based point of sale (POS) building and configuration, which can assist non-expert business operators in building, editing and testing a point of sale system to manage their businesses. The business operations range from a single branch to a large chain of stores or branches. The key advantages of the Web-based POS builder are that it is completely built on the foundation of the Web. The POS builder is accessible anywhere in the world. It can be used by a person of any skill level. The POS builder builds, edits, and tests new POS terminals in real time.

6 Claims, 5 Drawing Sheets

(56) References Cited

OTHER PUBLICATIONS

Co-pending U.S. Appl. No. 11/710,723, filed Feb. 26, 2007, "Point of Sale Video Server Processing System," by Quentin Olson et al, 25 pgs.
Co-pending U.S. Appl. No. 12/012,393, filed Feb. 1, 2008, "Hand-Held Web Browser Inventory Checking System," by Quentin Olson et al, 24 pgs.
Localsoft Tech, db2k e-Store Builder 3.00 details, 3 pgs, found Feb. 8, 2008, http://www.soft32downlaod.com/software/dbk-e-Store-Builder-download-details,html.
IBM 469 Astra—Graphical User Interface (GUI)—Specifications, 1 pg., found Feb. 8, 2008, http://www.03.ibm.com/products/retail/procucts/software/gui/astra/specs.html.

\* cited by examiner

| Qty | Description | Amount | | | | | |
|---|---|---|---|---|---|---|---|
| | | | PRETZELS | DRINKS | | | |
| | | | 11 | 12 | | | |
| | | | Caramel Crunch Pretzel | Cinnamon Sugar Pretzel | Garlic | Original Pretzel | Parmesan Pretzel |
| | | 13 | | | | | |
| | | | Pretzel Dog | Sour Cream & Onion Pretzel | Pretzel Sticks | Caramel | Cheddar Cheese |
| | | 13 | | | | | |
| | Total | | Honey Mustard | Nacho Cheese | Pizza Sauce | | |
| UP | DOWN | 14 | | | | | |
| 7 | 8 | 9 | QTY | | SOLD ITEM | COIN SALE | OPEN DRAWER |
| 4 | 5 | 6 | ENTER | | CASH | RETURN LAST RECEIPT | MISC |
| 1 | 2 | 3 | | | | | |
| CLEAR | 0 | 00 | | FUNCTION | $5 | $10 | $20 | $50 |

*FIG. 1*

| Qty | Description | Amount | | | | | |
|---|---|---|---|---|---|---|---|
| | garlic | 2.29 | HOME | DRINKS | SMALL | MEDIUM | LARGE |
| | pizza sauce | 0.59 | | | | | |
| | cranberry grape | 1.49 | | | | | |
| | large sprite | 1.50 | COKE | DIET COKE | PUNCH | | SPRITE |
| | | | | | | | |
| | | | | | | | |
| | | | APPLE JUICE | CRANBERRY APPLE RASPBERRY | CRANBERRY GRAPE | DANNON SPRING WATER | MINUTE MAID ORANGE JUICE |
| | | | | | | | |
| | | | COLUMBIAN | | VANILLA | NUT | MACADAMIA NUT |
| | Total | | | | | | |
| UP | | DOWN | | | | | |
| 7 | 8 | 9 | QTY | | | | |
| 4 | 5 | 6 | ENTER | | CASH | RETURN LAST RECEIPT | MISC |
| 1 | 2 | 3 | | | | | |
| CLEAR | 0 | 00 | | FUNCTION | $5 | $10 | $20 | $50 |

FIG. 2

| Screen 1 | Screen 2 | Screen 3 | Screen 4 |
|---|---|---|---|
| 21 | SUBS | | |
| Add Item 20 | Add Item | Add Item | Add Item |
| | | | |
| | | | |

*FIG. 4a*

Screen 1

| PIZZA | | | |
|---|---|---|---|
| LARGE PIZZA | | | |
| | | | |
| | | | |

22 — LARGE PIZZA

ITEM NAME _____
PRICE _____
COST _____
GROUP _____
TAXABLE _____
INVENTORY _____
} 23

*FIG. 4b* ized programmer had to design the layout and data
WEB-BASED POINT OF SALE BUILDER This is a continuation of U.S. patent application Ser. No. 12/012,666, filed on Feb. 5, 2008, which is herein incorporated by reference in its entirety, and assigned to a common assignee.

RELATED PATENT APPLICATIONS

This application is related to Ser. No. 11/710,722, filed on Feb. 26, 2007, and Ser. No. 11/710,723, filed on Feb. 26, 2007, which are herein incorporated by reference in its entirety.

BACKGROUND OF THE INVENTION

Field of the Invention

This invention relates to a system and a method for building a point of sale (POS) system to manage business operations. The business operations range from a single branch to a large chain of stores or branches.

More particularly this invention relates to an online, web-based point of sale builder method, which can assist non-expert business operators in assembling a point of sale system to manage their businesses.

Description of Related Art

Current practice in the field of assembling point of sale systems includes manually coding front-of-screen information. Typically, this front-of-screen information contains menu selections, page selections, and general answers to business questions. This front-of-screen menu is typically manually coded by a business expert with the help of a programmer or data expert. Also, currently the entry of this front-of-screen information requires intimate knowledge of a complex interface to a front-of-screen programming language. In summary, current practice includes the manual building of a point of sale (POS) screen. This manual process requires defining the position and operation of touch screen keys and their database correspondence. Currently, only specially trained people can build or change POS screens. This manual POS building and editing is prone to mistakes and is time-consuming. Since POS screen changes are difficult and prone to error, store owners tend to retain older, inaccurate, out-of-date POS screens in order to avoid the POS screen editing process. Also, current POS screen editing occurs off-line with the testing of the screens occurring at a later date, at a remote store location. The following references represent prior art in the field of screen configuration building.

U.S. Pat. No. 5,818,428 (Eisenbrandt et al.) describes a control system with a user configurable interface, particularly suitable for use in connection with appliances. Users can configure display screens either at a point of sale location or at home with a personal computer.

U.S. Pat. No. 6,629,080 B1 (Kolls) describes a universal advertising and payment system and method for networking, monitoring and advancing electronic commerce and controlling vending equipment.

U.S. Pat. No. 7,051,091 B1 (Cohen et al.) discloses a configuration builder useful in configuring software containing hardware units which are serviced by a center which services a multiplicity of similar units having a plurality of different configurations.

U.S. Pat. No. 5,987,426 (Goodwin) describes a system and method of transferring information between a first software application and a second software application which employ an isolation layer. The system includes a client computer system provided by a first seller of computer systems, including a client software application, and a server computer system provided by a second seller of computer system.

BRIEF SUMMARY OF THE INVENTION

It is the objective of this invention to provide a system and a method for building a point of sale (POS) system to manage business operations. The business operations range from a single branch to a large chain of stores or branches.

It is further an object of this invention to provide an online, web-based point of sale builder system and method, which can assist non-expert or expert business operators in assembling a point of sale system to manage their businesses. This point of sale building operation can be done in real time from anywhere in the world.

The objects of this invention are achieved by a web-based point of sale (POS) builder comprising one or more point of sale terminals, which display POS, screens, an Internet connection to a web server, one or more local or remote PC workstations, and point of sale builder software which runs on said web server. Local or remote workstations can be utilized to build or edit said POS terminals in real time, from anywhere in the world and over the world-wide web.

BRIEF DESCRIPTION OF THE DRAWINGS

FIG. 1 shows a typical point of sale touch screen for a pretzel store, as an example only.

FIG. 2 shows a typical touch screen for the drinks panel of a pizza restaurant, as an example only.

FIG. 4a is a sample screen builder panel before the screen building process begins.

FIG. 4b is a sample screen builder panel after the screen building process is under way.

DETAILED DESCRIPTION OF THE INVENTION

Figure 3:
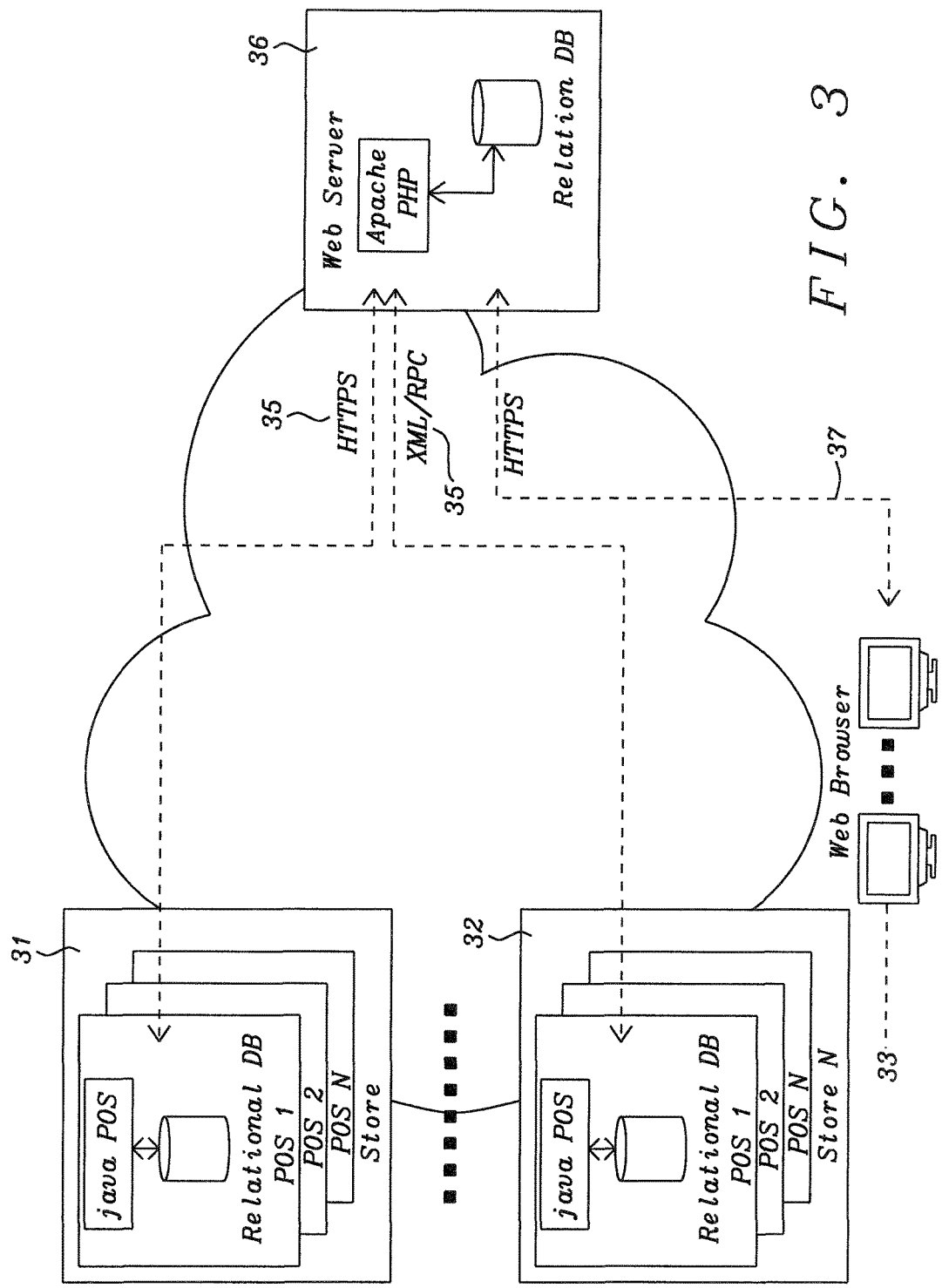
FIG. 3 is a system diagram for web-based back office which supports point of sale terminals.

FIG. 1 shows a typical point of sale (POS) touch screen for, as an example only, a pretzel store. There are touch keys for pretzels 11 and for drinks 12. Selecting these keys would typically bring up secondary screens displaying specific product keys for ordering different types of pretzels and drinks respectively. In addition, the screen in FIG. 1 has some specific pretzel product keys 13 and specific pretzel topping keys 14. Currently in the prior art, a touch screen as shown in FIG. 1 is manually configured by a programmer who knows the specific proprietary point of sale system used by a store or business. The FIG. 1 screen design involves the specific key layout and size of keys. In addition, the FIG. 1 screen keys must have corresponding hooks or references to product data such as item name, price, cost, group, taxable, and inventory as shown in FIG. 4. In this invention, this product data and the touch key structure is stored in relational databases in the back office which is stored on the web servers 36 shown in FIG. 3.

As an example only, FIG. 2 shows a touch screen for the drinks page of a pizza restaurant. Again in the prior art, a specialized programmer had to design the layout and data for these POS touch keys. Typically, the programmer is located remotely from the store or business. He or she must learn about the store's POS requirements via phone calls, emails, and meetings with store operators. In addition, the programmer would need to iterate several passes of the touch screen design and allow the store operator to test the screens. With this invention, the store operator will be able to build his POS screens online over the Internet. With input from the store operator, the POS builder can specify and display the number, shape and arrangement of selection keys or buttons on said POS screens. The store operator, who does not have to be technically trained, will be able to edit and test his screens until he is satisfied with the end results. The testing of said POS screens can be done iteratively by the store operator in real time while said POS terminals are simultaneously in use during store and business operation hours or after store hours. Alternatively, the testing of said POS screens can be done iteratively by a remotely located person such as a store manager or director in real time while said POS terminals are simultaneously in use during store hours or after store hours. All backoffice changes which include screen changes, price changes, employee validation changes are submitted to a batch bucket or queue. These changes have to be submitted for final posting at a scheduled time. For example, the phasing in of new screens and/or new data such as prices and employee validation can be scheduled. The time schedule for uploading or posting these screen changes and/or new data can be specified as follows. Only as examples, the changes can take place after the present transactions are completed. Alternatively, the changes can take place at the end of the business day, during the night, at the start of the next day or at the next application restart for example. Typically, screen changes will take place at the next application start at the beginning of a business day.

This automatic online POS builder will reduce the development time for POS screens by weeks. In addition, the store operator will be able to edit the POS screens and its relational databases any time as often as desired. In addition, the store operator will be able to edit, change and test the screens within minutes in real time. The store operator can iterate these changes instantly until he gets the desired screen appearance. This real-time testing and iteration of screen designs is an important feature of this invention. This feature motivates the store operator to keep his screens up to date and accurate. Previously, the store operator would avoid updating screens, since it involved the time and expense of working with programmers off line.

FIG. 3 shows a high level diagram of this invention. There are N POS terminals (POS 1, POS 2 . . . POS N) in "Store" 31 and in "Store N" 32. POS 31 is in Store 1 and POS 2 (32) is in Store 2. Each POS includes personal computer hardware and software. Additional POS terminals beyond those shown, as well as additional stores beyond the two shown, are within the scope of the invention. Each POS normally operates with a hardware/software connection 35 to the Internet or Web. However, if the web goes down, the POS terminal continues to operate. There is a "loose coupling" of the POS to the back office (BO): the POS to BO connection is not required for the basic business functions of the POS. All transaction data is stored in a relational database on the hard drive in the POS.

A relational database stores all of its data inside tables. All operations on data are done on the tables themselves. Some operation produce other tables as the result. A table is a set of rows and columns. Each row is a set of columns with only one value for each. All rows from the same table have the same set of columns, although some columns may have NULL values. A NULL value is an "unknown" value. The rows from a relational table are analogous to a record, and the columns are analogous to a field. Below is an example of a relational table.

```
+--------------------+---------------+-----------------------+
| NAME               | COMPANY| E_MAIL                       |
+====================+===============+=======================+
| Jane A. Doe        | ABC           | jad@abc.com           |
+--------------------+---------------+-----------------------+
| Bill X. Smith      | XYZ           | bxs@xyz.com           |
+--------------------+---------------+-----------------------+
```

There are two basic operations one can perform on a relational table. The first one is retrieving a subset of its columns. The second is retrieving a subset of its rows. The field names such as company describe the content of the columns of the relational table. The rows delineate the individual records stored in the relational tables.

As transactions are created at a POS a log entry for the newest transaction is also created, this log entry is used to flag if the transaction has been uploaded to the web server. Part of the POS application, the BO interface is continuously running in the background. This component reads the log of transactions. If a transaction needs to be sent, it tries to send it. If the send fails (for example, if the connection to, or the Internet itself, is down), it goes to sleep and tries again later. Additionally, the BO interface requests update from the BO such as new items, price changes, employees, etc. The POS terminals communicate via HTTP protocol (hypertext transfer protocol) 35 with Back-office BO software, which is implemented on web servers 36, which can be located anywhere in the world. In addition, the BO software and data can be viewed from any store employee at any PC 33 who has Internet access 37 and a password.

The POS such as 31 send transaction data to the BO in the form of an HTTP post or communication. The packet 35 sent from the POS to the BO consists of transactions, employee clock, customer add/update, item add/update, promotions and more. Promotions are configured in the back office and associated with items or customers or departments. For example, a promotion may be associated with a customer to implement customer loyalty points or a promotion may be associated with a certain item for a % discount. A client who is the store manager or owner selects a promotion type, associates it with an item, department, etc, then sets the parameters that control how that promotion works. These transaction transmissions between the POS and the BO can be encrypted to insure privacy and security. A typical encryption method is 128 bit SSL (secure sockets layer). A further element of security is that each BO client (individual POS, store or multi-store owner) gets their own instance of a database. When they log into the BO they are attached to their own relational database associated and validated via their user login and password.

FIGS. 4a and 4b show a typical web-based POS builder interface. FIG. 4a shows a grid of boxes labeled with screen numbers 1-4. Typically, screens will have screen names such as in 21, "Subs". Under each screen box column are boxes labeled "Add Item". These boxes allow the addition of different products such as small pizza, large pizza, etc. as shown in FIG. 4b. FIG. 4b shows the data interface which would appear when selecting the large pizza box. The store operator would be able to enter and/or modify item name, price, cost, group, taxable and inventory. The above illustrates the ease of building POS screens by store operators via the Web.

Figure 5:
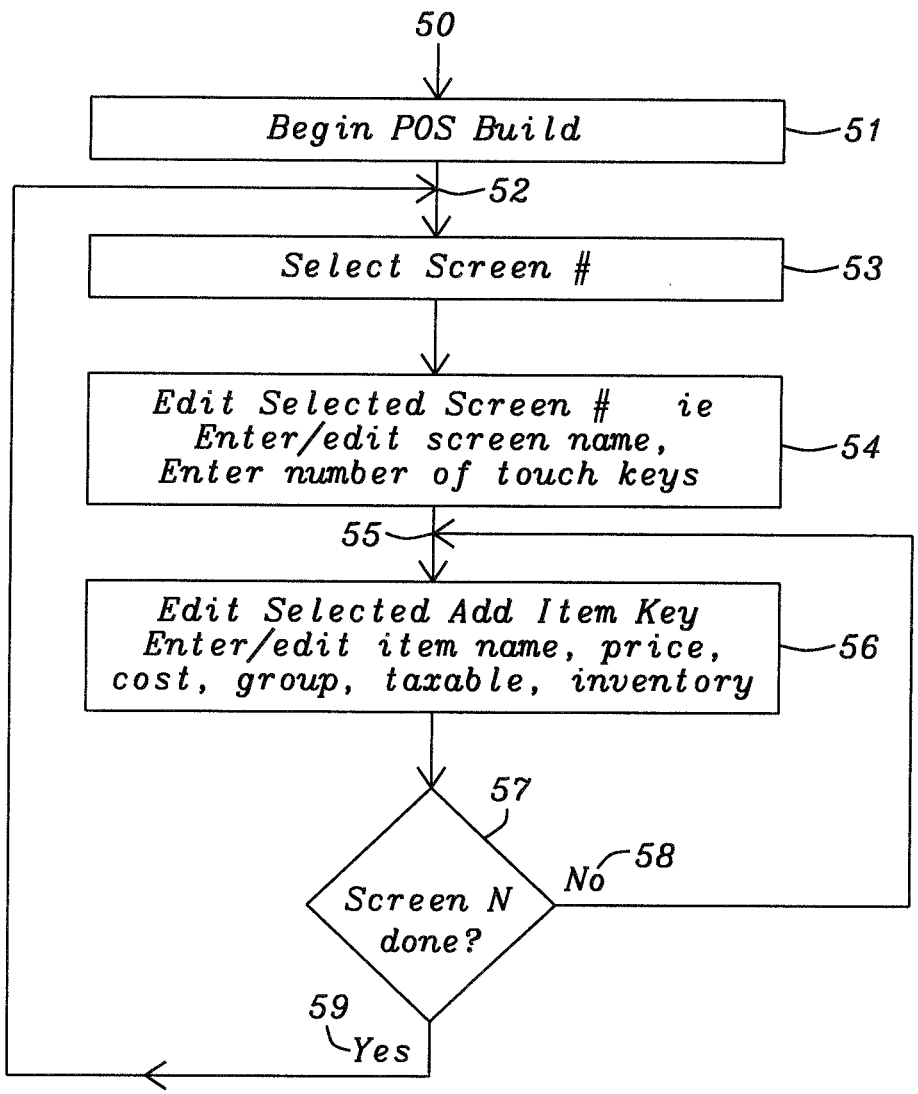
FIG. 5 is a high level flowchart which illustrates the main embodiment of the screen building process.

FIG. 5 shows a flowchart of the point of sale builder methodology. The flow in FIG. 5 also refers to FIGS. 4a and 4b. The Begin POS Build block 51 is entered when the Builder Program is initiated 50 from a Web page action.

When creating a new POS, Block 51 brings up a screen such as that shown in FIG. 4a. The screens in FIG. 4a need to be defined. Block 53 allows the store operator to select which screen number to define. FIG. 4b shows what appears on the Web screen after the store operator selects screen #1 (53) to work on. In FIG. 5, Block 54 allows the store operator to enter/edit the screen name being worked on, such as pizza, as an example only, in FIG. 4b. In FIG. 5, block 54 allows the store operator to enter the number of touch keys planned for the pizza screen, as an example only.

FIG. 4b shows the screen after a few touch screen buttons have been defined. Screen 1 has been labeled Pizza. The pizza screen in FIG. 4b currently has 1 touch screen button item defined on the screen, Large pizza 22. The Large Pizza item button was entered by hitting ADD Item 20 in FIG. 4a. After hitting add item, FIG. 4b appears with the template 23 to be filled in. This step is shown in block 56 of FIG. 5. The template includes Item Name, Price, Cost, Group, Taxable, Inventory. Item Name is Large Pizza. Price is easily changeable, Cost is the cost of making materials. Group is the Pizza Group, Taxable is as yes or no selection. Inventory can be used to monitor the number of Large Pizza's makeable with the dough, cheese and sauce on hand. Other Template items can be added to the template 23 in FIG. 4b.

In FIG. 5, block 57 asks whether the screen being worked on i.e.) Pizza Screen is done. If the store operator answers yes 59, the flowchart flows to Node 52 in FIG. 5. This allows the store operator to select another screen # as shown in FIG. 4a. If the store operator answers no 58, the flowchart flows to Node 55 in FIG. 5. This allows the store operator to select, add, or edit another item on the pizza screen.

The key advantages of the Web-based POS builder are that it is completely built on the foundation of the Web. The POS builder is accessible anywhere in the world. It can be used by a person of any skill level. The POS builder builds, edits, and tests new POS terminals in real time. In addition, all screen designs and changes are reflected real-time into the back office (BO) server's screen database. For example, all screen designs inputted from any PC in the world appear instantly in the BO screen database, which is instantly viewable anywhere in the world via web browsers. Another big advantage is that all screen design software is located and executed in the BO server. Since all screen designs and changes are immediately visible from any manager's PC at their home or at headquarters, there is always management oversight of these changes. Therefore, this screen builder allows for local in-store flexibility by the individual store operator or manager, but also provides for corporate visibility of screens instantly for control and standardization. Also, this screen builder does not require the need for any server to be located in the store. Another advantage of this system is the use of standard PC and web architecture which offers both full-scalability without degrading system performance. This results in improved performance and lower cost of implementing these business systems. There is a lower cost associated with projects developed with the technology of this invention due to the flexibility of easy design changes and well-understood software. There is less training required for programmers and system testers. Projects can draw on the huge talent pool in the open source development community. The invention allows configurable software modules for different types of businesses and sales promotions. The invention allows remote monitoring of screen designs from anywhere via the web. There is minimal time required for the implementation and installation of the POS builder system, since the POS builder setup is as basic as a home PC setup. Another advantage is that the POS builder system can be provided as a service or deployed within a corporation. For example, Software as a Service (SAAS) is a software distribution model in which applications are hosted by a vendor or service provider and made available to customers over a network, typically the Internet. Another advantage of this invention is that the POS builder system is maintained in customer centric databases, making it impossible for customers to see other's data. Each POS builder system client gets their own instance of a database. When they log into the BO they are attached to their own relational database associated and validated via their user login and password.

While this invention has been particularly shown and described with Reference to the preferred embodiments thereof, it will be understood by those Skilled in the art that various changes in form and details may be made without Departing from the spirit and scope of this invention.

What is claimed is:

1. A web-based point of sale (POS) builder system comprising:
   a web server having installed thereon POS builder software,
   one or more POS terminals, that display POS screens and are in network communication with said web server via a network connection,
   a POS builder interface, and
   one or more cameras associated with said one or more POS terminals, said one or more cameras for capturing video of POS transactions at said one or more POS terminals,
   wherein said POS builder interface is utilized to access said POS builder software for programmatically creating or modifying said POS terminals in real time over the network, wherein access to said web server is provided as a subscription service, wherein said POS builder software interacts with said one or more POS terminals over said network in order for the system to perform functions in accordance with instructions sent from the POS builder interface,
   wherein the network comprises the internet,
   wherein said captured video is correlated with POS transaction data for corresponding transactions occurring at said POS terminals, and
   wherein said captured video and correlated transaction data from said one or more POS terminals are transmitted to said web server via said network connection.

2. The web-based point of sale (POS) builder system of claim 1 wherein said captured video is remotely viewable.

3. The web-based point of sale (POS) builder system of claim 1 wherein the POS builder interface is accessible on local workstations.

4. The web-based point of sale (POS) builder system of claim 1 wherein the POS builder interface is accessible on remote workstations.

5. The web-based point of sale (POS) builder system of claim 1 wherein communication via the network connection to the web server is not necessary for continued operation of a given POS terminal.

6. The web-based point of sale (POS) builder system of claim 5 wherein continued operation includes capturing video and correlating captured video and transaction data.

\* \* \* \* \*